(12) United States Patent
Misawa

(10) Patent No.: US 7,386,168 B2
(45) Date of Patent: Jun. 10, 2008

(54) IMAGE PROCESSING APPARATUS

(75) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 10/781,671

(22) Filed: Feb. 20, 2004

(65) Prior Publication Data
US 2004/0165782 A1   Aug. 26, 2004

(30) Foreign Application Priority Data
Feb. 24, 2003   (JP)   ............... 2003-046226

(51) Int. Cl.
*G06K 9/00*   (2006.01)
(52) U.S. Cl. .................. 382/166; 382/162; 382/232; 382/233
(58) Field of Classification Search .......... 382/166, 382/162, 232, 233, 239, 173, 199, 266, 100, 382/168, 242; 375/240.11, 240.03, 240.19; 713/176
See application file for complete search history.

(56) References Cited

U.S. PATENT DOCUMENTS

| | | | | |
|---|---|---|---|---|
| 6,965,695 | B2 * | 11/2005 | Yamakawa | ............ 382/199 |
| 7,133,565 | B2 | 11/2006 | Toda et al. | |
| 2002/0037100 | A1 | 3/2002 | Toda et al. | ............ 382/166 |

FOREIGN PATENT DOCUMENTS

| | | | |
|---|---|---|---|
| JP | 404326669 A | * | 11/1992 |
| JP | 404358475 A | * | 12/1992 |
| JP | 2002-077633 | | 3/2002 |
| JP | 2002-165105 | | 6/2002 |

* cited by examiner

*Primary Examiner*—Anh Hong Do
(74) *Attorney, Agent, or Firm*—Fitzpatrick, Cella, Harper & Scinto

(57) ABSTRACT

A binarizing unit binarizes a multilevel image. A region specifying unit A specifies the position of a character region in the binary image, and determines whether or not the specified character region is an inverted character region. A region specifying unit B specifies the position of a unit character region. A reducing unit reduces the multilevel image. A representative color extracting unit extracts the representative color of a unit character region on the basis of region type information indicating whether or not a character region is an inverted character region, position information of a unit character region, and a reduced multilevel image. A character region padding unit pads a character region of a reduced multilevel image with its neighboring color on the basis of position information of the character region. A JPEG compressing unit compresses a padded reduced multilevel image. An MMR compressing unit compresses a partial binary image corresponding to a character region. Compressed data containing position information, the compressed code created by each compressing unit, and the representative color information of a unit character region is output.

24 Claims, 17 Drawing Sheets

ABCDE

FGHIJKLMN
OPQRSTUV
WXYZABCD
EFGHIJKLM
NOPQRSTU
VWXYZABC
DEFGHIJKL
MNOPQRST
UVWXYZ

FGHIJKLMNO
PQRSTUVWX
YZABCDEFGH
IJKLMNOPQR
STUVWXYZ

701

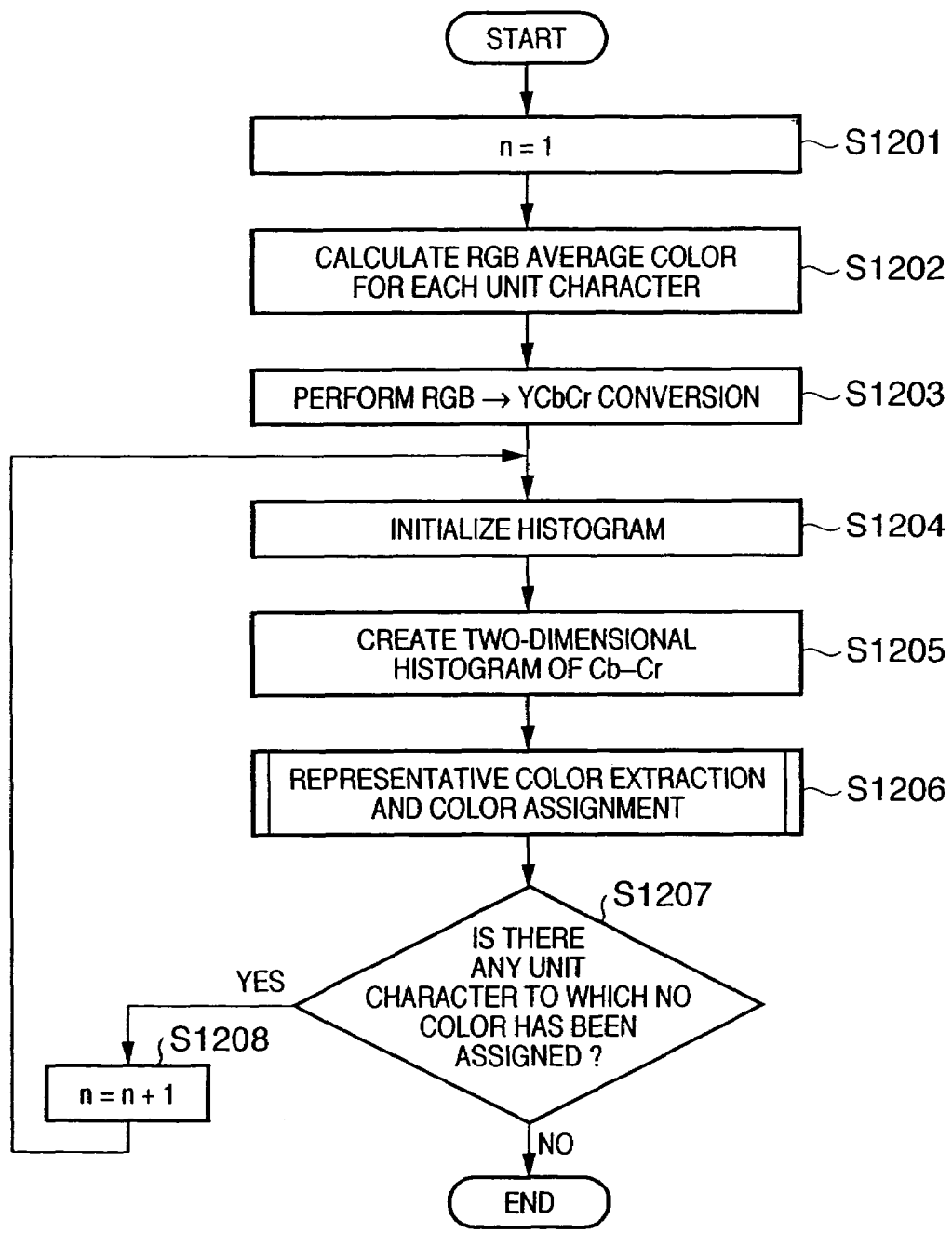

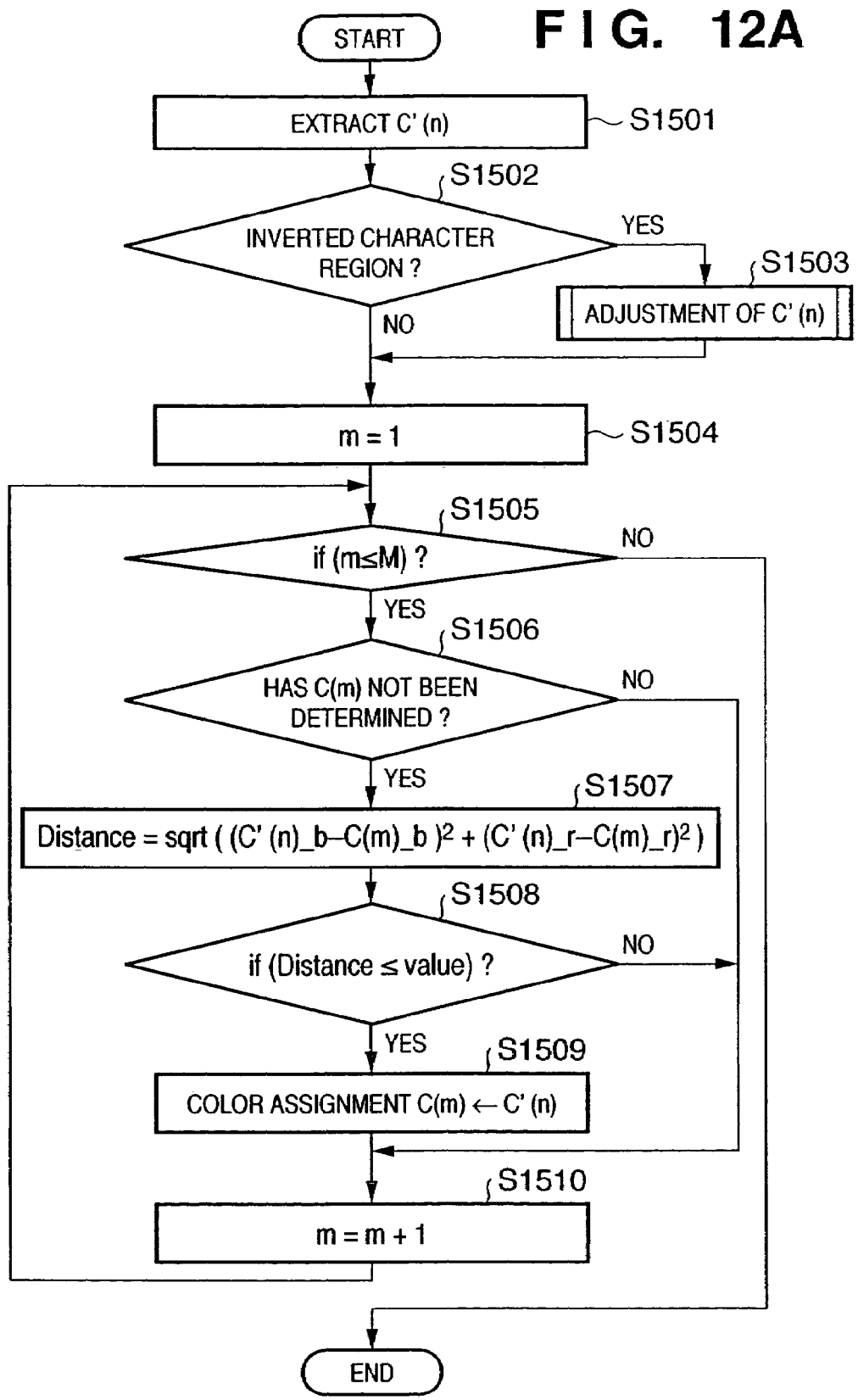

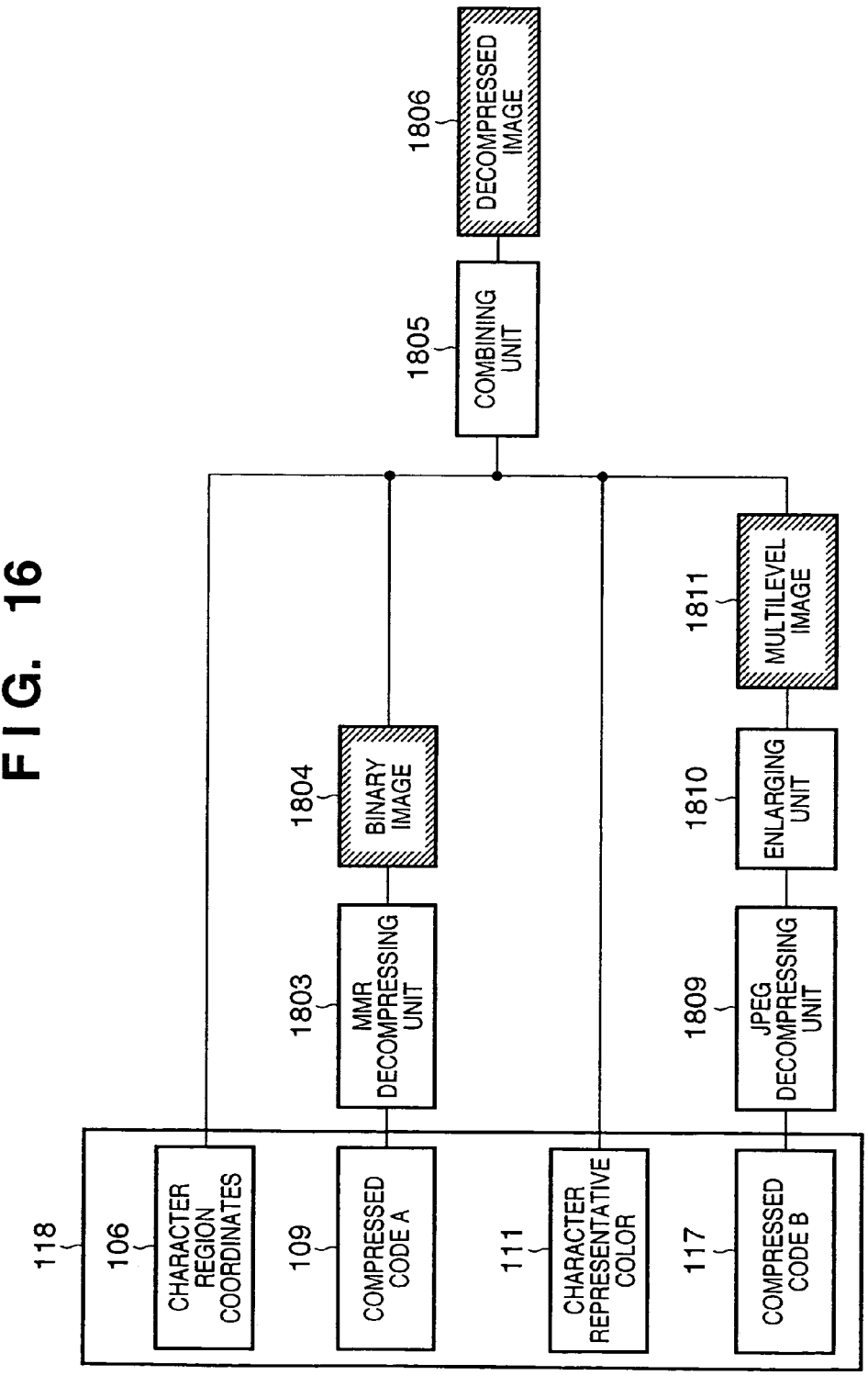

IMAGE PROCESSING APPARATUS

FIELD OF THE INVENTION

For example, the present invention relates to an image processing apparatus which compresses an input multilevel image and, more particularly, to an image processing technique of decompressing compressed data created by the image processing apparatus.

BACKGROUND OF THE INVENTION

Recently, with the proliferation of scanners, the digitization of documents has been showing progress. When a digitized document, e.g., an A4-size document, is stored in a full-color bitmap form, the resultant data becomes about 24 Mbytes with a read resolution of 300 dpi, requiring a large-capacity memory. Such large-volume data is not suitable to be attached to mail and transmitted.

In general, therefore, full-color images are compressed. As a compression method for such data, JPEG is known. JPEG is very effective in compressing natural images such as photographs. When, however, a character portion is JPEG-compressed, image deterioration called mosquito noise occurs. According to a conventional method available, therefore, an input image is segmented into a character region and a photographic region, and the character region is MMR-compressed upon binarization while the photographic region is JPEG-compressed, thereby expressing even a full-color image with a small data size while maintaining the quality of the character region.

This method is wherein at the time of decompression, the white portion of a binary image is expressed by making a JPEG image transparent, and the black portion is expressed by a character in its representative color. Another characteristic feature of this method is that one color is assigned to a unit character. This makes it possible to eliminate variations in character images originally expressed in monochrome due to scanner reading. In addition, using this method for a compression system can realize high-image-quality compression.

In addition, as an enhance technique, for example, a method of further increasing the compression ratio by padding a character region with the color of a portion near the character before JPEG compression has been proposed. A color extraction technique of extracting the representative color of a character in a character region portion is also indispensable, and has been proposed before. This color extraction technique is a technique of inputting a binary image of a character region, the coordinates of the character region, and a color image, and extracting a desired color in a character region portion from the color image.

According to the conventional technique, however, a color-inverted character region portion cannot be specified, and hence the inverted character region is JPEG-compressed, resulting in a deterioration in the inverted character portion.

Recently, a technique of specifying an inverted character region portion has been proposed. This makes it necessary to develop a technique of extracting a color from an inverted character region. When the conventional color extraction technique is used without any modification, the color of an inverted character region of an input image which is blurred by variations due to scanner reading or a compression effect is directly reproduced (extracted).

SUMMARY OF THE INVENTION

The present invention has been made in consideration of the above problems, and has as its object to provide an image processing technique which can create a good reconstructed image and can perform image compression without degrading the image quality of a compression target.

According to the present invention, the foregoing object is attained by providing an image processing apparatus which compresses an input multilevel image, comprising:

binarizing means for binarizing the multilevel image;

first region specifying means for specifying a position of a character region in the binary image binarized by the binarizing means, and determining whether or not the specified character region is an inverted character region;

second region specifying means for specifying a position of a unit character region in the character region specified by the first region specifying means;

reducing means for reducing the multilevel image;

representative color extracting means for extracting a representative color of the unit character region on the basis of region type information indicting whether or not the character region specified by the first region specifying means is an inverted character region, position information of the unit character region specified by the second region specifying means, and the reduced multilevel image;

padding means for padding a unit character region in the character region of the reduced multilevel image with a neighboring color on the basis of the position information of the character region specified by the first region specifying means;

first compression means for compressing the padded reduced multilevel image created by the padding means;

second compression means for compressing a partial binary image corresponding to the character region specified by the first region specifying means; and output means for outputting compressed data containing the position information specified by the first and second region specifying means, first and second compressed codes created by the first and second compression means, and representative color information of the unit character region extracted by the representative color extracting means.

In a preferred embodiment, the representative color extracting means comprises average color calculating means for calculating an average color of the unit character regions by using the position information of the unit character region specified by the second region specifying means and referring to color information of the reduced multilevel image, first histogram creating means for creating a first histogram from the average color of the unit character regions created by the average color calculating means, extracting means for extracting a candidate representative color serving as a representative color candidate of the unit character region on the basis of the first histogram, and color assigning means for assigning the candidate representative color to a representative color of the unit character on the basis of region type information indicating whether or not the character region specified by the first region specifying means is an inverted character region, the candidate representative color extracted by the extracting means, and the average color of the unit character regions.

In a preferred embodiment, the binarizing means comprises second histogram creating means for creating a second histogram on the basis of the multilevel image, and binarization threshold calculating means for calculating a binarization threshold for binarizing the multilevel image on the basis of the second histogram.

In a preferred embodiment, the first region specifying means specifies regions, which are specified by contour line tracking of pixels having a predetermined value in the binary image, as a character region or a natural image region, specifies whether the character region is an inverted character region, and specifies attribute information indicating position information, size information, and a type of each of the regions.

In a preferred embodiment, the second region specifying means specifies, as a unit character region, a set of pixels having a predetermined value in the character region specified by the first region specifying means, and specifies position information and size information of the unit character region.

In a preferred embodiment, the average color calculating means calculates an average color of the unit character regions by using position information of a unit character region specified by the second region specifying means and referring to color information of the reduced multilevel image corresponding to pixels having a predetermined value in the unit character region.

In a preferred embodiment, the first histogram creating means creates a color space histogram in a character region constituted by the unit character regions as a first histogram by using an average color of the unit character regions which is calculated by the average calculating means.

In a preferred embodiment, the extracting means extracts candidate representative colors as candidates of representative colors of the unit character regions in descending order of output frequency of color distributions in the color spatial histogram.

In a preferred embodiment, the color assigning means calculates a distance between a candidate representative color extracted by the extracting means and an average color of the unit character regions on a color space, and assigns the candidate representative color as a representative color of the unit character regions if the distance falls within a predetermined range.

In a preferred embodiment, the color assigning means calculates a distance between a candidate representative color extracted by the extracting means and an average color of the unit character regions on a color space, and assigns a predetermined color as a representative color of the unit character regions if the distance falls within a predetermined range and the character region constituted by the unit character regions is an inverted character region.

In a preferred embodiment, the reducing means converts a resolution of the multilevel image by using a resolution conversion parameter.

In a preferred embodiment, the padding means pads a unit character region in a character region of the reduced multilevel image corresponding to a position corresponding to a reduction ratio set by the reducing means on the basis of position information of the character region specified by the first region specifying means.

In a preferred embodiment, the first compression means complies with JPEG compression.

In a preferred embodiment, the second compression means complies with MMR compression.

In a preferred embodiment, the apparatus further comprising third compression means for losslessly compressing the compressed data.

According to the present invention, the foregoing object is attained by providing an image processing apparatus which decompresses compressed data, comprising:

input means for inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;

first decompressing means for decompressing the first compressed code in the compressed data;

second decompressing means for decompressing the second compressed code in the compressed data;

enlarging means for enlarging a reduced multilevel image decompressed by the second decompressing means; and combining means for combining a binary image decompressed by the decompressing means and a multilevel image enlarged by the enlarging means.

According to the present invention, the foregoing object is attained by providing an image processing method of compressing an input multilevel image, comprising:

a binarizing step of binarizing the multilevel image;

a first region specifying step of specifying a position of a character region in the binary image binarized in the binarizing step, and determining whether or not the specified character region is an inverted character region;

a second region specifying step of specifying a position of a unit character region in the character region specified in the first region specifying step;

a reducing step of reducing the multilevel image;

a representative color extracting step of extracting a representative color of the unit character region on the basis of region type information indicting whether or not the character region specified in the first region specifying step is an inverted character region, position information of the unit character region specified in the second region specifying step, and the reduced multilevel image;

a padding step of padding a unit character region in the character region of the reduced multilevel image with a neighboring color on the basis of the position information of the character region specified in the first region specifying step;

a first compression step of compressing the padded reduced multilevel image created in the padding step;

a second compression step of compressing a partial binary image corresponding to the character region specified in the first region specifying step; and an output step of outputting compressed data containing the position information specified in the first and second region specifying steps, first and second compressed codes created in the first and second compression steps, and representative color information of the unit character region extracted in the representative color extracting step.

According to the present invention, the foregoing object is attained by providing an image processing method of decompressing compressed data, comprising:

an input step of inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;

a first decompressing step of decompressing the first compressed code in the compressed data;

a second decompressing step of decompressing the second compressed code in the compressed data;

an enlarging step of enlarging a reduced multilevel image decompressed in the second decompressing step; and a combining step of combining a binary image decompressed in the decompressing step and a multilevel image enlarged in the enlarging step.

According to the present invention, the foregoing object is attained by providing a program which realizes image compression of compressing an input multilevel image, comprising:

a program code for a binarizing step of binarizing the multilevel image;

a program code for a first region specifying step of specifying a position of a character region in the binary image binarized in the binarizing step, and determining whether or not the specified character region is an inverted character region;

a program code for a second region specifying step of specifying a position of a unit character region in the character region specified in the first region specifying step;

a program code for a reducing step of reducing the multilevel image;

a program code for a representative color extracting step of extracting a representative color of the unit character region on the basis of region type information indicting whether or not the character region specified in the first region specifying step is an inverted character region, position information of the unit character region specified in the second region specifying step, and the reduced multilevel image;

a program code for a padding step of padding a unit character region in the character region of the reduced multilevel image with a neighboring color on the basis of the position information of the character region specified in the first region specifying step;

a program code for a first compression step of compressing the padded reduced multilevel image created in the padding step;

a program code for a second compression step of compressing a partial binary image corresponding to the character region specified in the first region specifying step; and a program code for an output step of outputting compressed data containing the position information specified in the first and second region specifying steps, first and second compressed codes created in the first and second compression steps, and representative color information of the unit character region extracted in the representative color extracting step.

According to the present invention, the foregoing object is attained by providing a program which realizes image decompression of decompressing compressed data, comprising:

a program for an input step of inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;

a program for a first decompressing step of decompressing the first compressed code in the compressed data;

a program for a second decompressing step of decompressing the second compressed code in the compressed data;

a program for an enlarging step of enlarging a reduced multilevel image decompressed in the second decompressing step; and a program for a combining step of combining a binary image decompressed in the decompressing step and a multilevel image enlarged in the enlarging step.

According to the present invention, the foregoing object is attained by providing an image processing apparatus which compresses an input multilevel image, comprising:

binarizing means for binarizing the multilevel image;

first region specifying means for specifying a position of a character region in the binary image binarized by the binarizing means, and determining whether or not the specified character region is an inverted character region;

second region specifying means for specifying a position of a unit character region in the character region specified by the first region specifying means;

representative color extracting means for extracting a representative color of the unit character region on the basis of region type information indicting whether or not the character region specified by the first region specifying means is an inverted character region, position information of the unit character region specified by the second region specifying means, and the multilevel image.

In a preferred embodiment, the apparatus according to claim 21, wherein the extracting means extracts a representative color of the inverted character region, after the inverted character region is applied by an inversion processing.

According to the present invention, the foregoing object is attained by providing an image processing method of compressing an input multilevel image, comprising:

a binarizing step of binarizing the multilevel image;

a first region specifying step of specifying a position of a character region in the binary image binarized in the binarizing step, and determining whether or not the specified character region is an inverted character region;

a second region specifying step of specifying a position of a unit character region in the character region specified in the first region specifying step;

a representative color extracting step of extracting a representative color of the unit character region on the basis of region type information indicting whether or not the character region specified in the first region specifying step is an inverted character region, position information of the unit character region specified in the second region specifying step, and the multilevel image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flow chart showing the details of representative color extraction processing in the embodiment of the present invention;

FIG. 12A is a flow chart showing the details of representative color extraction and color assignment processing in step S1006 in the embodiment of the present invention;

FIG. 16 is a block diagram showing the schematic arrangement of an image decompression apparatus according to the embodiment of the present invention.

DETAILED DESCRIPTION OF THE PREFERRED EMBODIMENT

A preferred embodiment of the present invention will be described in detail in accordance with the accompanying drawings.

Note that the relative positions of the constituent elements of an image compression apparatus and image decompression method according to the embodiment to be described below, and mathematical expressions, numerical values, and the like used in each processing are not those to which the scope of the present invention is limited unless otherwise specified.

Figure 1:
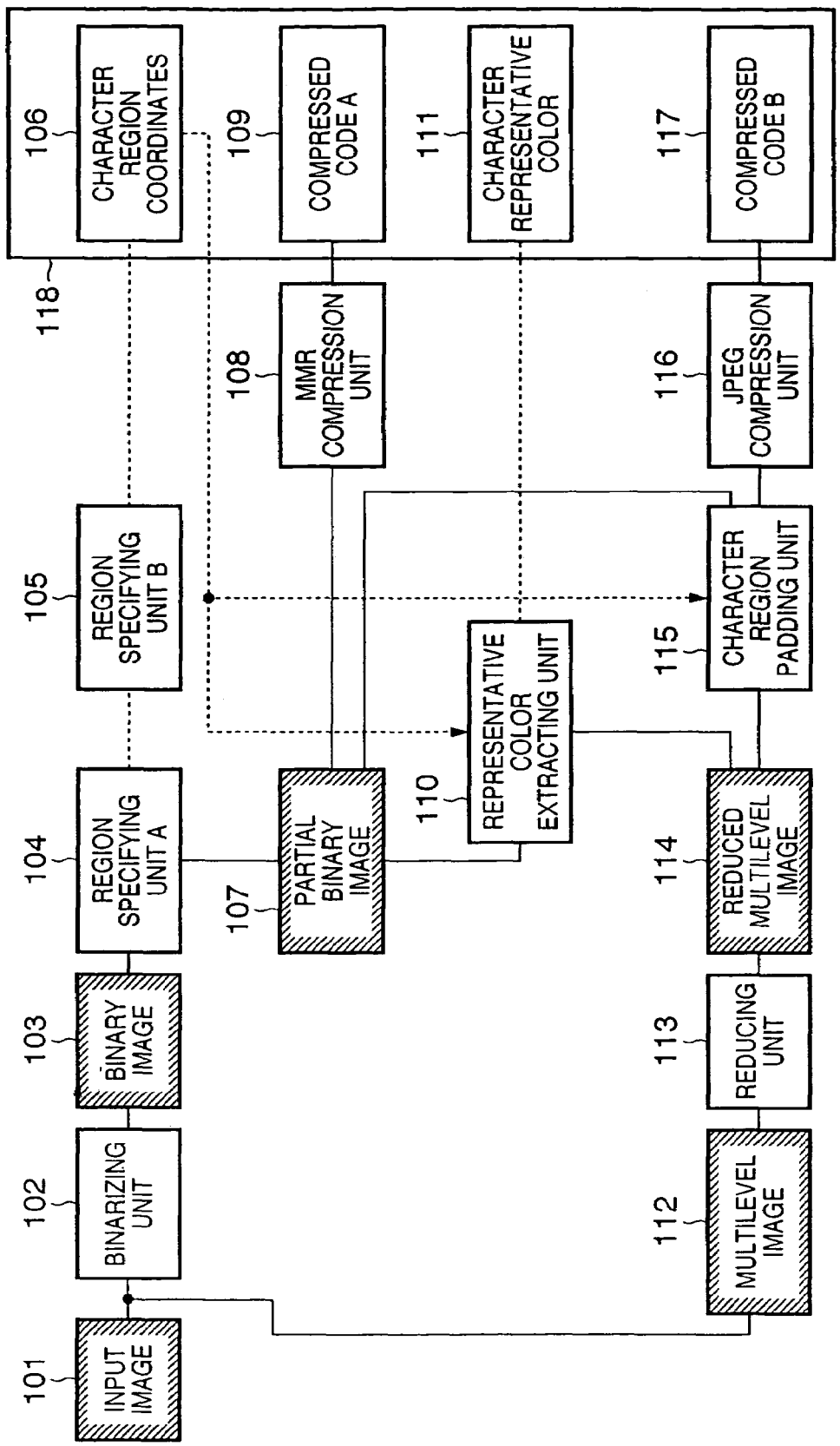
FIG. 1 is a block diagram showing the schematic arrangement of an image compression apparatus according to an embodiment of the present invention.

FIG. 1 is a view showing the schematic arrangement of the image compression apparatus according to an embodiment of the present invention.

Referring to FIG. 1, the solid lines indicate the flows and inputting of images, and the dotted lines indicate the flows and inputting of information.

An input image 101 which is a color multilevel image is binarized by a binarizing unit 102 to create a binary image 103. A region specifying unit A 104 receives the binary image 103, and creates character region coordinates 106 by detecting a character region by, for example, contour line tracking of pixels having a predetermined value (e.g., black pixels). The character region coordinates 106 are information indicating the position (coordinates) and size of the character region. Obviously, when the region specifying unit A 104 specifies a character region, the position and size of a natural (grayscale) image region, other than the character region, which indicates a natural image such as a photograph or illustration are specified. In addition, attribute information (character or image) for specifying the type of each region is created separately.

A region specifying unit B 105 receives the character region coordinates 106 created by the binary image 103 and region specifying unit A 104, and specifies the position and size of each character (unit character region) in the character region. For the sake of simplicity, assume that in this embodiment, information about the position and size of each unit character region is added to the character region coordinates 106. In addition, a binary image (partial binary image 107) in each character region is created from the character region coordinates 106 created by the region specifying unit A 104. A multilevel image 112 is reduced by a reducing unit 113 to create a reduced multilevel image 114.

Note that the reducing unit 113 converts the resolution of the multilevel image 112 on the basis of a set resolution conversion parameter. This resolution conversion parameter may be properly controlled on the basis of the spatial frequency of a multilevel image to be processed. For example, this resolution conversion parameter may be controlled to convert the resolution into a lower resolution when the high-frequency component of a multilevel image is small than when it is large.

A representative color extracting unit 110 receives and refers to the partial binary image 107, character region coordinates 106, and reduced multilevel image 114, and calculates a character representative color 111 of each unit character region in the character region while positionally associating a black portion of the partial binary image 107 with the reduced multilevel image 114. Note that the multilevel image 112 is identical to the input image 101.

A character region padding unit 115 receives and refers to the partial binary image 107, reduced multilevel image 114, and character region coordinates 106, and pads each character region or each unit character region on the reduced multilevel image 114 with its neighboring color (replacing it with the neighboring color).

After the above processing, each partial binary image 107 is sequentially compressed into a compressed code A 109 by an MMR compression unit 108. The padded reduced multilevel image padded by the character region padding unit 115 is JPEG-compressed into a compressed code B 117 by a JPEG compression unit 116. Note that instead of the MMR compression unit 108, a unit using a binary image compression scheme, other than MMR compression, e.g., JPEG compression, MR compression, or MH compression, may be used.

In this manner, compressed data 118 is created by combining a data group including the character region coordinates 106, compressed code A 109, each character representative color 111, and compressed code B 117 which are obtained from each constituent element. The compressed data 118 may be further losslessly compressed into PDF or the like.

Note that if no character region exists in the input image 101, the compressed data 118 is made of only the compressed code B 117.

A hardware arrangement that implements an image compression apparatus and an image decompression apparatus which decompresses compressed data created by the image compression apparatus is implemented by a general-purpose computer such as a personal computer. This general-purpose computer includes, as its standard constituent elements, for example, a CPU, RAM, ROM, hard disk, external storage unit, network interface, display, keyboard, mouse, and the like.

These image compression apparatus and image decompression apparatus may be implemented as dedicated hardware implemented as extension cards for such a general-purpose computer.

In practice, for example, these image compression apparatus and image decompression apparatus are mounted in a multifunction apparatus (an apparatus having, for example, copy, printer, scanner, and facsimile functions), color scanner, and color facsimile.

The binarization processing executed by the binarizing unit 102 will be described next with reference to FIGS. 2 and 3.

Figure 2:
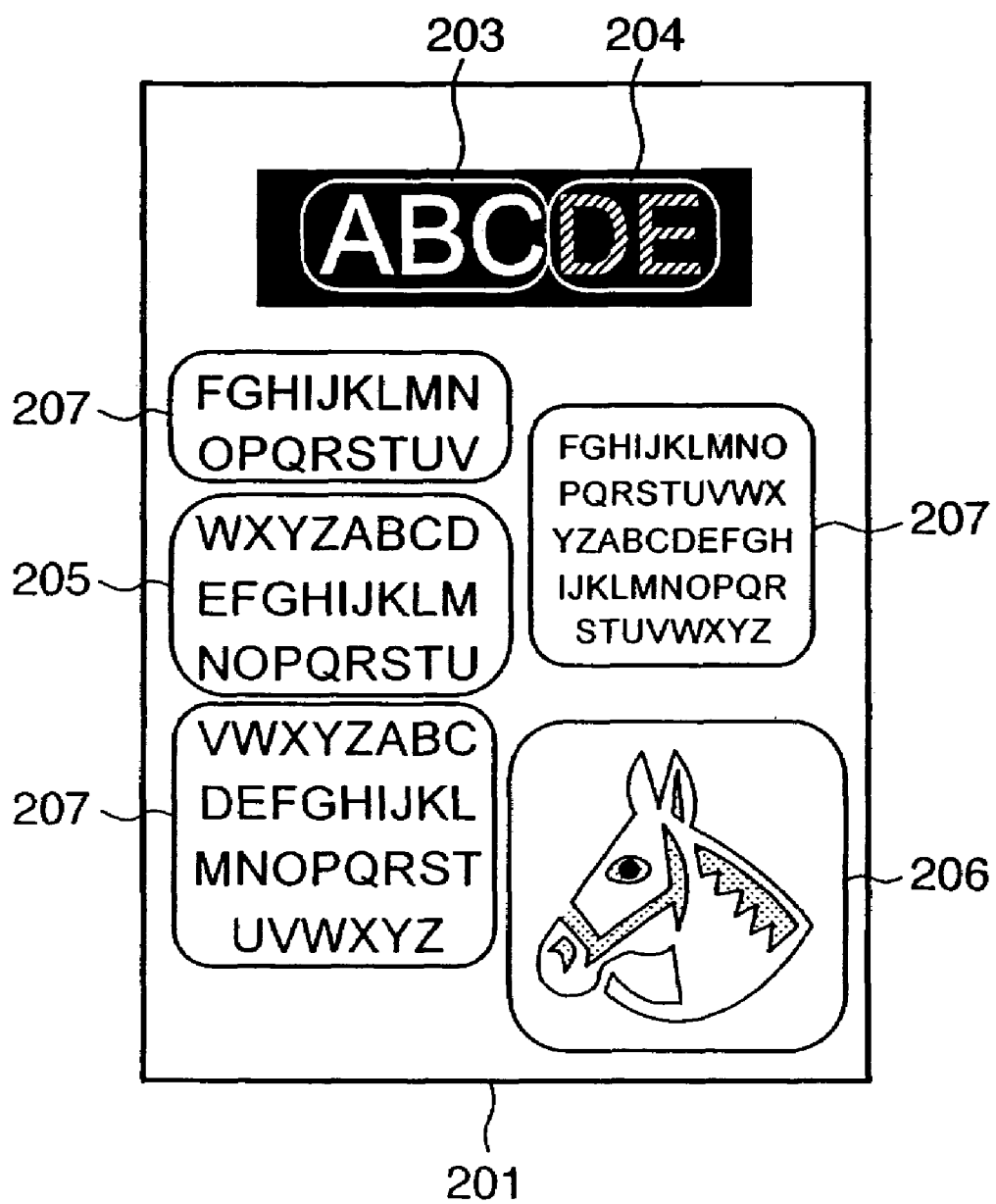
FIG. 2 is a view showing an example of an input image in the embodiment of the present invention.
Figure 3:
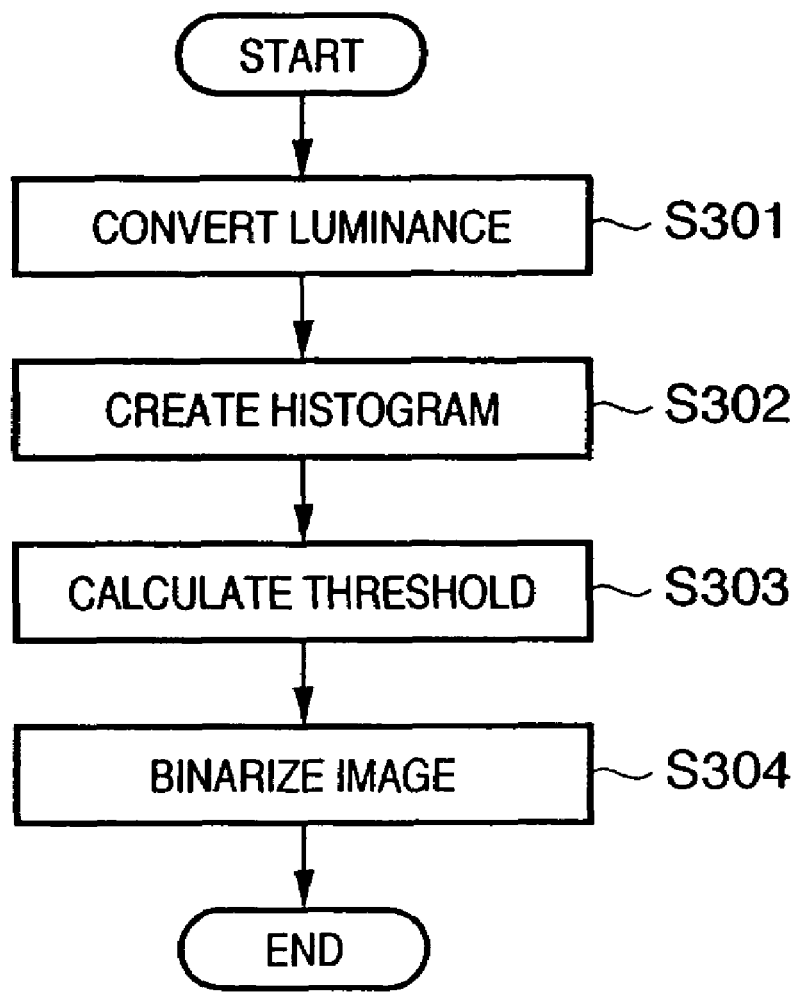
FIG. 3 is a flow chart showing the binarization processing executed by a binarizing unit in the embodiment of the present invention.

FIG. 2 is a view showing an example of an input image in the embodiment of the present invention. FIG. 3 is a flow chart showing the binarization processing executed by the binarizing unit in the embodiment of the present invention.

Referring to FIG. 2, assume that an input image 201 is a color multilevel image, the characters in a region 203 are white, the characters in a region 204 are yellow, the characters in a region 205 are blue, the characters in a region 207 are black, and the image in a region 206 has a plurality of arbitrary colors. Note that when the input image 201 is obtained by scanner reading, the image includes variations at the time of reading and a deterioration due to JPEG compression. Obviously, however, this embodiment is also directed to images including no deterioration.

Assume that in the following case, the input image 101 is RGB data (24 bits) obtained by scanner reading. In this case, first of all, in step S301, luminance conversion is performed according to the following conversion equation to create a luminance image:

$$Y=0.299 \times R+0.587 \times G+0.114 \times B$$

Figure 4:
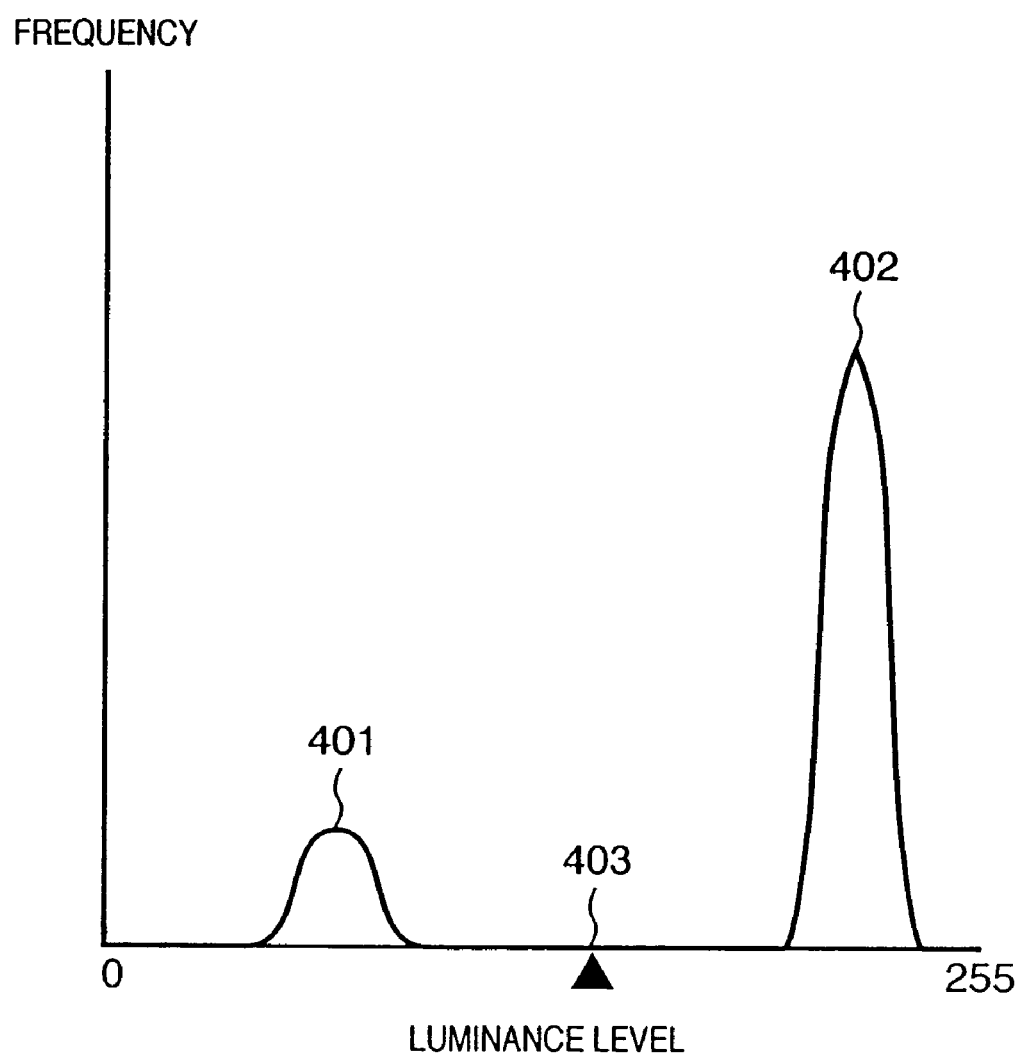
FIG. 4 is a graph showing an example of the histogram of an input image in the embodiment of the present invention.

In step S302, the entire histogram of the luminance image is created. FIG. 4 shows an example of the histogram. Referring to FIG. 4, the abscissa represents the luminance level of the Y signal, ranging from 0 to 255; and the ordinate, the frequency of occurrence. Referring to FIG. 4, reference numeral 401 denotes the distribution of character and image information; and 402, the distribution of background information.

In step S303, an optimal binarization threshold T is calculated. Note, however, that the calculation method for the binarization threshold T is not specifically limited. Referring to FIG. 4, for example, a middle point 403 between the luminance level of the peak of the distribution 401 and that of the distribution 402 is set as the binarization threshold T.

Finally, in step S304, the luminance image is binarized on the basis of the binarization threshold T.

Figure 7:
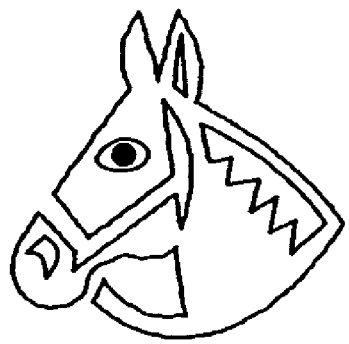
FIG. 7 is a view showing an example of a binary image in the embodiment of the present invention.

With the above processing, the binary image 103 in FIG. 1 is created. The binary image obtained by binarizing the input image 201 in FIG. 2 is, for example, a binary image 701 in FIG. 7.

The processing executed by the region specifying unit A 104 will be described next with reference to FIG. 5.

Figure 5:
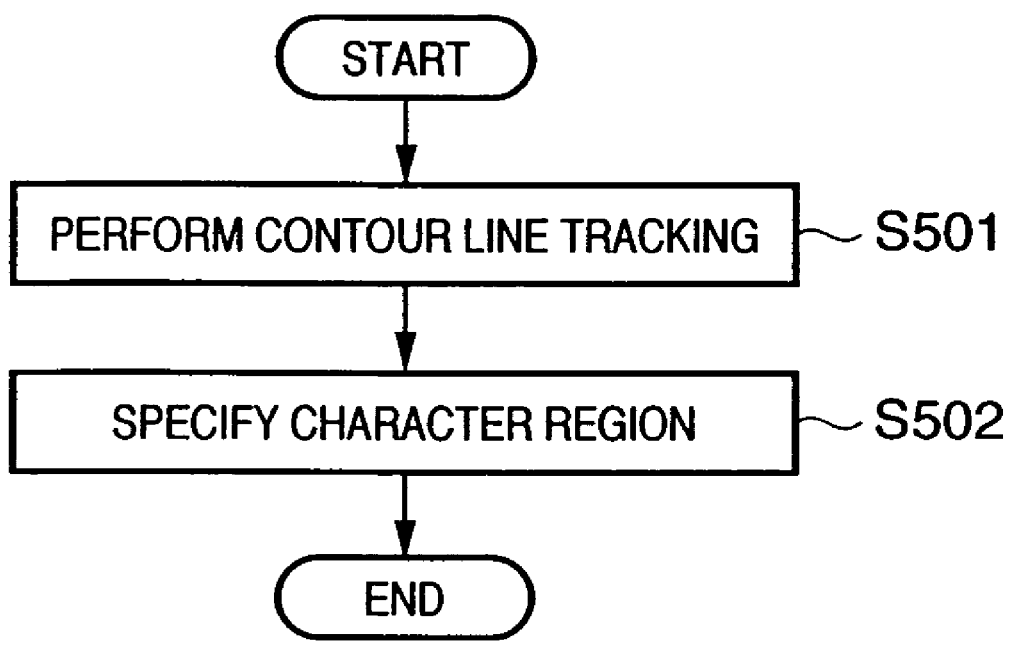
FIG. 5 is a flow chart showing the processing executed by a region specifying unit A in the embodiment of the present invention.

FIG. 5 is a flow chart showing the processing executed by the region specifying unit A 104 in the embodiment of the present invention.

First of all, in step S501, contour line tracking is performed while referring to the black pixels of the binary image 103. In step S502, tracking is further performed within the tracked contour line, and a character region and its position and size are specified from the region within the contour line on the basis of the tracking result. It is further specified whether or not the specified character region is an inverted character region. Region type information indicating whether or not the region is an inverted character region is then created and stored in the memory. Note that a region other than the character region is specified as a natural image region.

Figure 8:
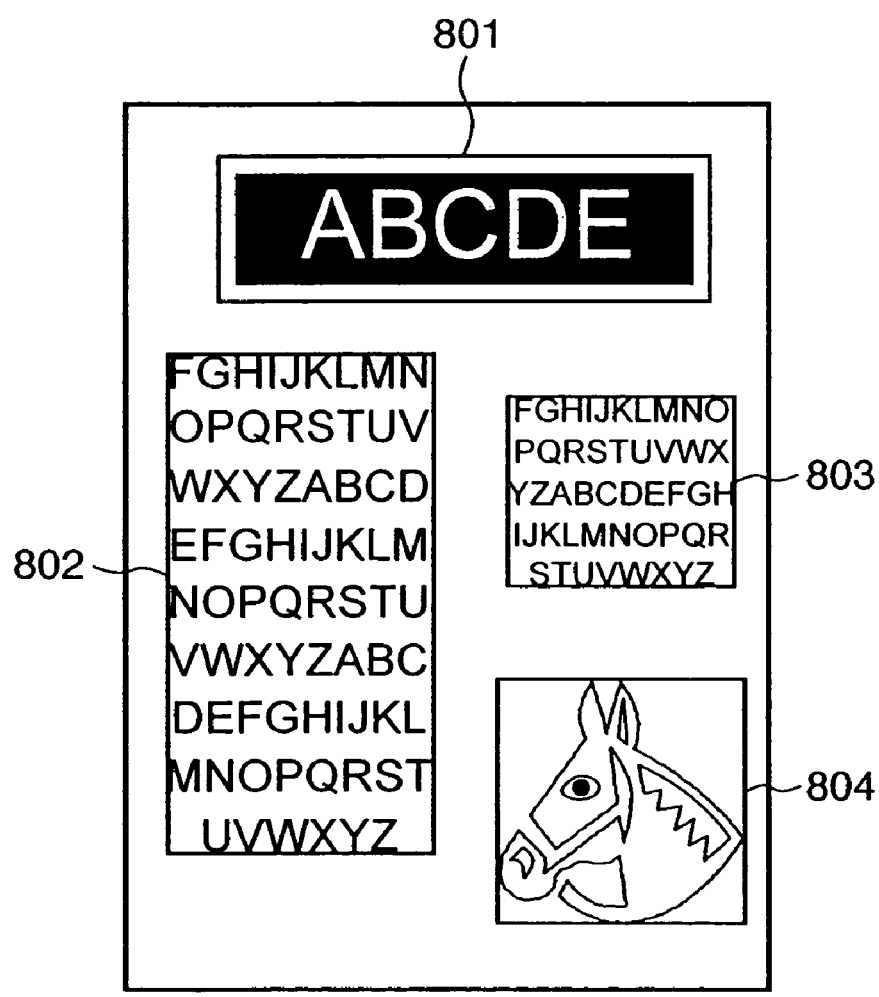
FIG. 8 is a view showing an example of the processing result obtained by the region specifying unit A in the embodiment of the present invention.

The above processing specifies the positions and sizes of the character region, inverted character region, and natural image region and attributes indicating the types of the respective regions. FIG. 8 shows the result obtained when the region specifying unit A 104 processes the binary image 701 in FIG. 7. Referring to FIG. 8, a total of four regions are specified, i.e., character regions 801 to 803, of which the character region 801 is an inverted character region, and a natural image region 804.

The processing executed by the region specifying unit B 105 will be described next with reference to FIG. 6.

Figure 6:
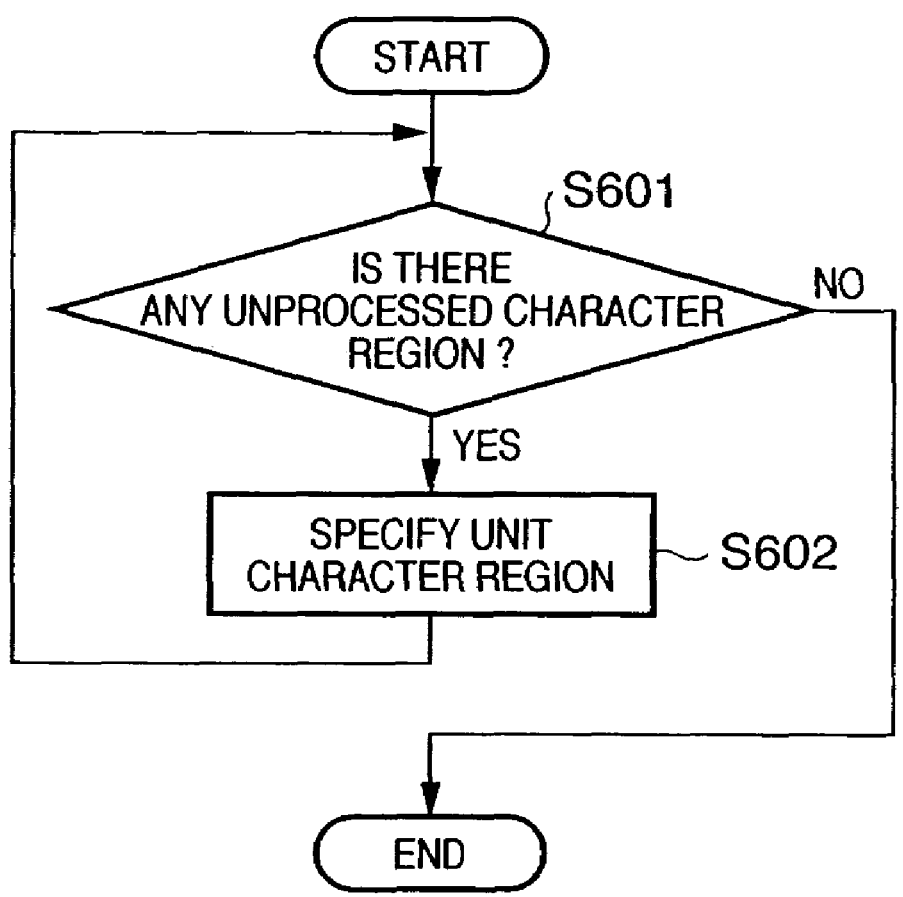
FIG. 6 is a flow chart showing the processing executed by a region specifying unit B in the embodiment of the present invention.

FIG. 6 is a flow chart showing the processing executed by the region specifying unit B 105 in the embodiment of the present invention.

The processing to be describe with reference to FIG. 6 is sequentially executed for the character regions specified by the region specifying unit A 104, i.e., the character regions 801 to 803 in the case shown in FIG. 8.

First of all, in step S601, it is checked whether there is any unprocessed character region. If there is no unprocessed character region (NO in step S601), the processing is terminated. If there is an unprocessed character region (YES in step S601), the flow advances to step S602.

Figure 9:
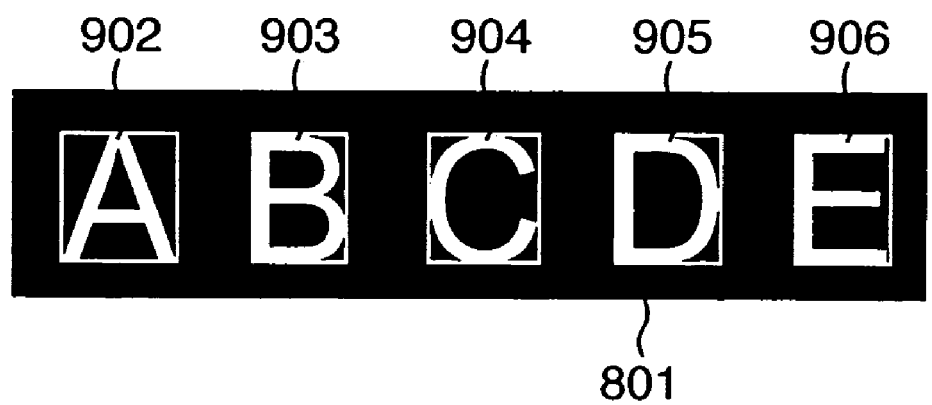
FIG. 9 is a view showing an example of the processing result obtained by the region specifying unit B in the embodiment of the present invention.

In step S602, a set of pixels having a predetermined binary image value (black pixels, or white pixels in an inverted character region) is regarded as a unit character, and the position of the unit character region is specified. FIG. 9 shows the result obtained when the region specifying unit B 105 processes the character region 801 in FIG. 8. Referring to FIG. 9, a total of five unit character regions 902 to 906 are specified. Subsequently, similar processing is executed for the character regions 802 and 803 in FIG. 8.

The region information (positions, sizes, and execution/nonexecution of inversion) of the character regions/unit character regions specified by the region specifying unit A 104 and region specifying unit B 105 is stored as the character region coordinates 106 in, for example, a memory (e.g., a RAM) in the image compression apparatus.

The processing executed by the representative color extracting unit 110 will be described next with reference to the flow charts of FIGS. 10 to 12A and 12B and FIGS. FIGS. 13 and 14.

Figure 10:
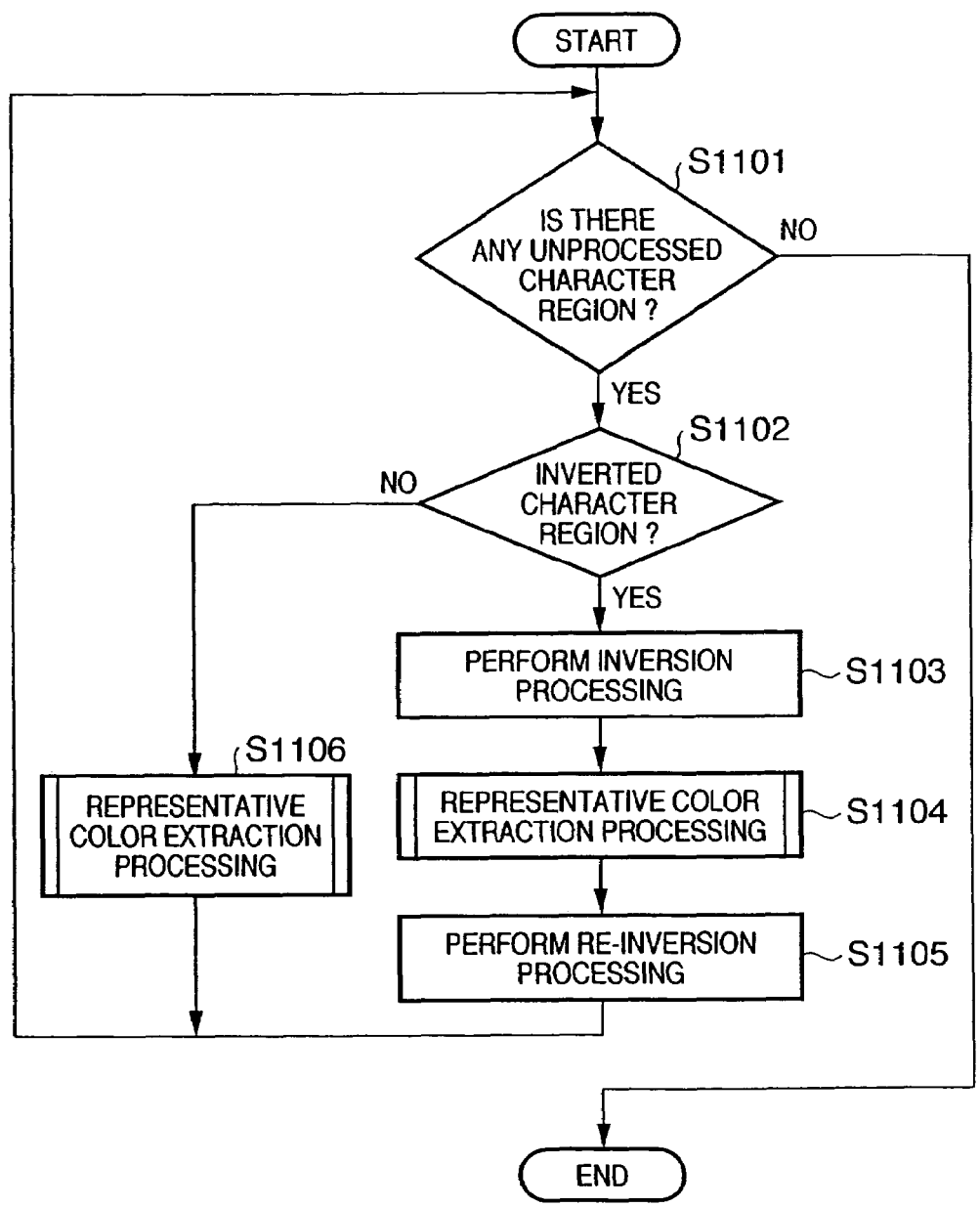
FIG. 10 is a flow chart showing the processing executed by the representative color extracting unit in the embodiment of the present invention.

FIG. 10 is a flow chart showing the processing executed by the representative color extracting unit in the embodiment of the present invention.

As described above, the representative color extracting unit 110 uses the character region coordinates 106, partial binary image 107, and reduced multilevel image 114 as inputs. Assume that the partial binary image 107 has been stored in a memory such as another work memory upon extraction of a character region from the binary image 103. Assume that the reduced multilevel image 114 has been obtained by reducing the multilevel image 112 using the reducing unit 113 and stored in a memory such as another work memory.

This embodiment will be described on the assumption that the reduction ratio of the reducing unit 113 is 50%. In this case, the capacity of the work memory for a reduced multilevel image can be reduced to ¼ that of the work memory for a multilevel image before reduction. Obviously, however, the reduction ratio is not limited to 50% and can be set to an arbitrary reduction ratio in accordance with the application or purpose.

The representative color extracting unit 110 sequentially processes all character regions, i.e., all partial binary images 107 (in this embodiment, there are three character regions, i.e., the character regions 801 to 803 in FIG. 8, which are processed in the order named). First of all, therefore, it is checked in step S1101, while referring to the character region coordinates 106, whether there is any unprocessed character region. If no unprocessed character region is present (NO in step S1101), the processing is terminated. If there is an unprocessed character region (YES in step S1101), the flow advances to step S1102.

In step S1102, it is checked, while referring to the character region coordinates 106, whether or not a character region is an inverted character region. If an inverted character region is determined (YES in step S1102), the flow advances to step S1103 to invert the color of the inverted character region by inversion processing. That is, white characters are inverted into black characters. Thereafter, the representative color extracting unit 110 executes representative color extraction processing (step S1104).

The reason why the inversion processing in step S1103 is executed for an inverted character region is to make a processing condition common to representative color extraction processing applied to general character regions so as to apply a common algorithm to the representative color extracting unit 110. After the processing by the representative color extracting unit 110, however, the character region must be restored to the original inverted character region. In step S1105, therefore, the color of the character region having undergone the inversion processing in step S1103 is re-inverted by re-inversion processing. That is, the black characters are inverted into white characters.

If it is determined in step S1102 that the character region is not an inverted character region (NO in step S1102), the flow advances to step S1106 to cause the representative color extracting unit 110 to execute representative color extraction processing.

The representative color extraction processing in step S1104 or S1106 will be described in detail next with reference to FIG. 11.

FIG. 11 is a flow chart showing the details of representative color extraction processing in the embodiment of the present invention.

As described above, representative color extraction processing is directed to both character and inverted character regions. However, representative color extraction processing for an inverted character region is accompanied by special processing to be described later. In this embodiment, therefore, as an example of processing for an inverted character region, representative color extraction processing for the inverted character region 801 in FIG. 9 will be described below.

First of all, in step S1201, 1 is set to a representative color count n of the character region. This indicates that "the first color is extracted". In step S1202, an average RGB color is calculated for each unit character while referring to the character region coordinates 106 and the color (RGB) of the reduced multilevel image 114 positionally corresponding to the black pixels of the partial binary image 107.

In step S1203, the average RGB color of each unit character region calculated above is converted into a color space expressed by a luminance Y and color difference CbCr, e.g., YCbCr.

Although as this color space, another color space such as Lab or Yuv may be used, the following description is based on YCbCr. A description of equations for conversion from RGB to YCbCr will be omitted.

This embodiment is wherein if the input image 101 is a JPEG image, the data in the YCbCr color space can be directly input at the time of JPEG decompression without YCbCr->RGB conversion which is generally performed. For this reason, in this case, there is no need to perform the processing in step S1203. This makes it possible to realize higher speed processing.

For example, the following are the results obtained by performing YCbCr conversion for the five unit character regions 902 to 906 in FIG. 9:

unit character region 902: (Y1, Cb1, Cr1)
unit character region 903: (Y2, Cb2, Cr2)
unit character region 904: (Y3, Cb3, Cr3)
unit character region 905: (Y4, Cb4, Cr4)
unit character region 906: (Y5, Cb5, Cr5)

In step S1204, histogram initialization (histogram clear) is performed for the preparation of histogram creation in step S1205. In step S1205, a two-dimensional histogram of color differences Cb and Cr is created. FIG. 13 shows this histogram. Five plots 1301 to 1305 in FIG. 13 are:

plot 1301 (Cb1, Cr1)→plot of unit character region 902
plot 1302 (Cb2, Cr2)→plot of unit character region 903
plot 1363 (Cb3, Cr3)→plot of unit character region 904
plot 1304 (Cb4, Cr4)→plot of unit character region 905
plot 1305 (Cb5, Cr5)→plot of unit character region 906

A set of plots 1301, 1302, and 1303 is located distant from a set of plots 1304 and 1305 to express the difference in color between the regions 203 and 204 of the input image (color multilevel image) 201 in FIG. 2. The differences among the plots 1301, 1302, and 1303 and the difference between the plots 1304 and 1305 indicate variations in input images read by the scanner or variations due to processing (e.g., JPEG compression) after reading.

In addition, of the unit character regions in the character region 801, the unit character regions (inverted unit character regions) 902 to 904, i.e., the plots 1301 to 1303, are expected to be white (Cb, Cr)=(0, 0). However, for the same reason as for the above variations, the color of the background portion of each inverted character region affects the character portion of the inverted unit character region. As a consequence, the region is plotted at a position distant from (Cb, Cr)=(0, 0).

In this embodiment, in order to increase the processing speed, a two-dimensional histogram is created in step S1205. However, to improve the precision, a three-dimensional histogram of Y, Cb, and Cr may be created.

Refer back to FIG. 11.

In step S1206, representative color extraction and color assignment are performed for each unit character region. This processing will be described in detail later.

It is checked in step S1207 whether there is any unit character to which no color is assigned in step S1206. If there is a unit character to which no color is assigned (YES in step S1207), the flow advances to step S1208. The representative color count n is incremented by one, and the previously created histogram is initialized (step S1204). A histogram is then created for only the unit character to which no color is assigned (step S1205). Subsequently, this processing is continued in the same manner until it is determined in step S1207 that there is no unit character to which no color is assigned. If there is no unit character to which no color is assigned (NO in step S1207), the processing is terminated.

Representative color extraction processing and color assignment processing for each unit character region in step S1206 will be described in detail next with reference to FIGS. 12A and 12B.

Figure 12B:
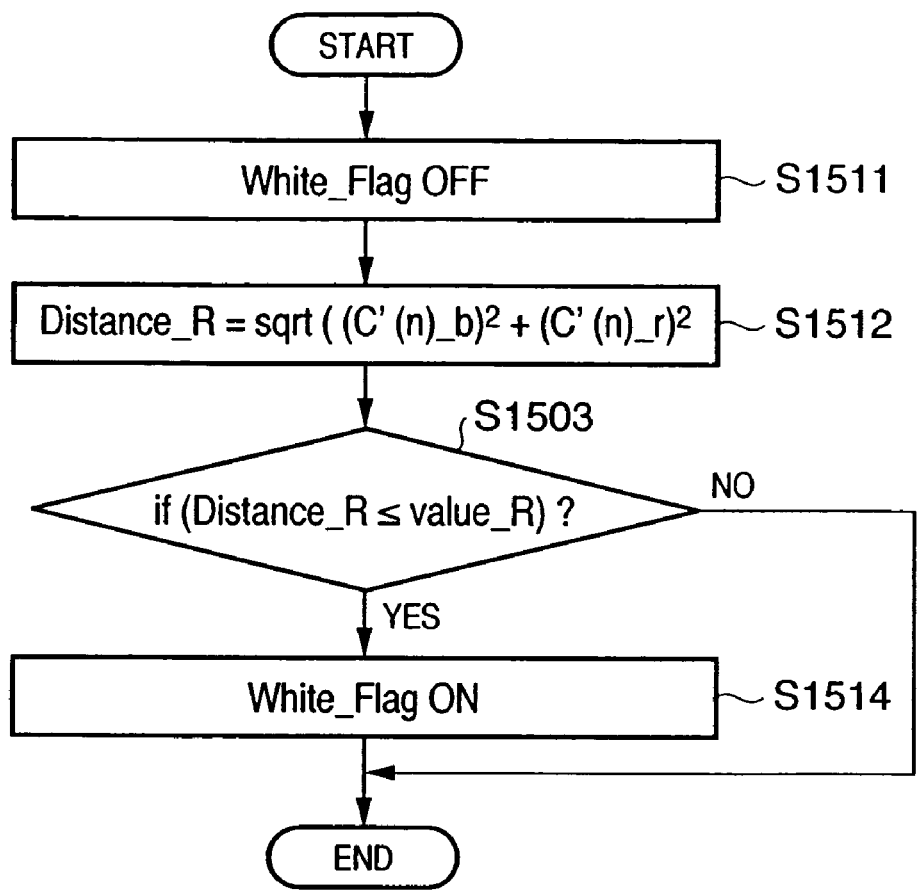
FIG. 12B is a flow chart showing the details of step S1503 in the embodiment of the present invention.
Figure 13:
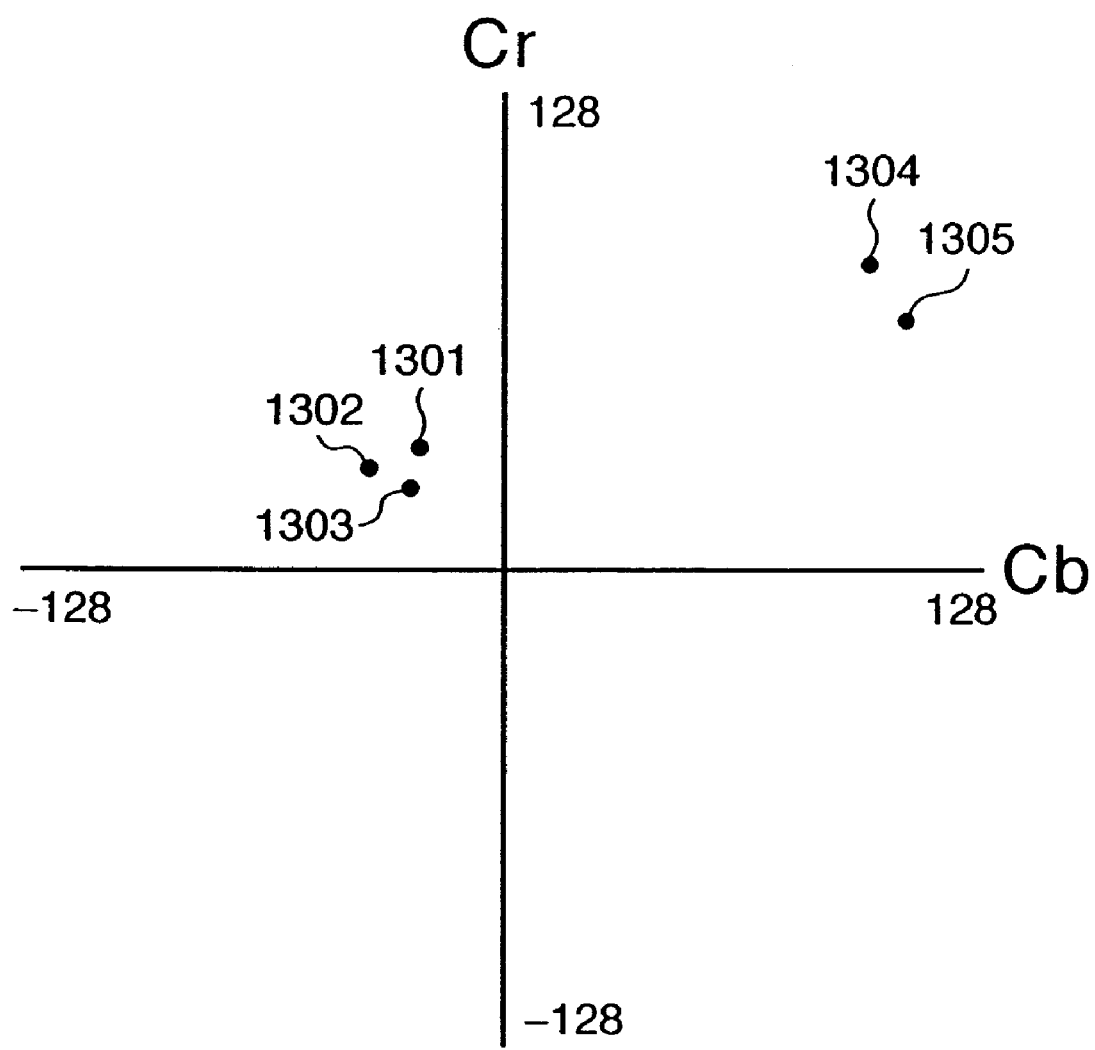
FIG. 13 is a view for explaining processing in the representative color extracting unit in the embodiment of the present invention.

FIGS. 12A and 12B are flow charts showing the details of representative color extraction processing and color assignment processing in step S1206 in the embodiment of the present invention.

First of all, in step S1501, a candidate representative color C'(n) as a candidate of the representative color of a unit character region is extracted. Note that n represents a representative color count, which is identical to n used in FIG. 11. The candidate representative color C'(n) is a structure having Cb/Cr information. Let C'(n)_b be Cb of the nth representative color, and C'(n)_r be Cr of the nth representative color.

A specific method of extracting representative colors will be described with reference to FIG. 14.

Figure 14:
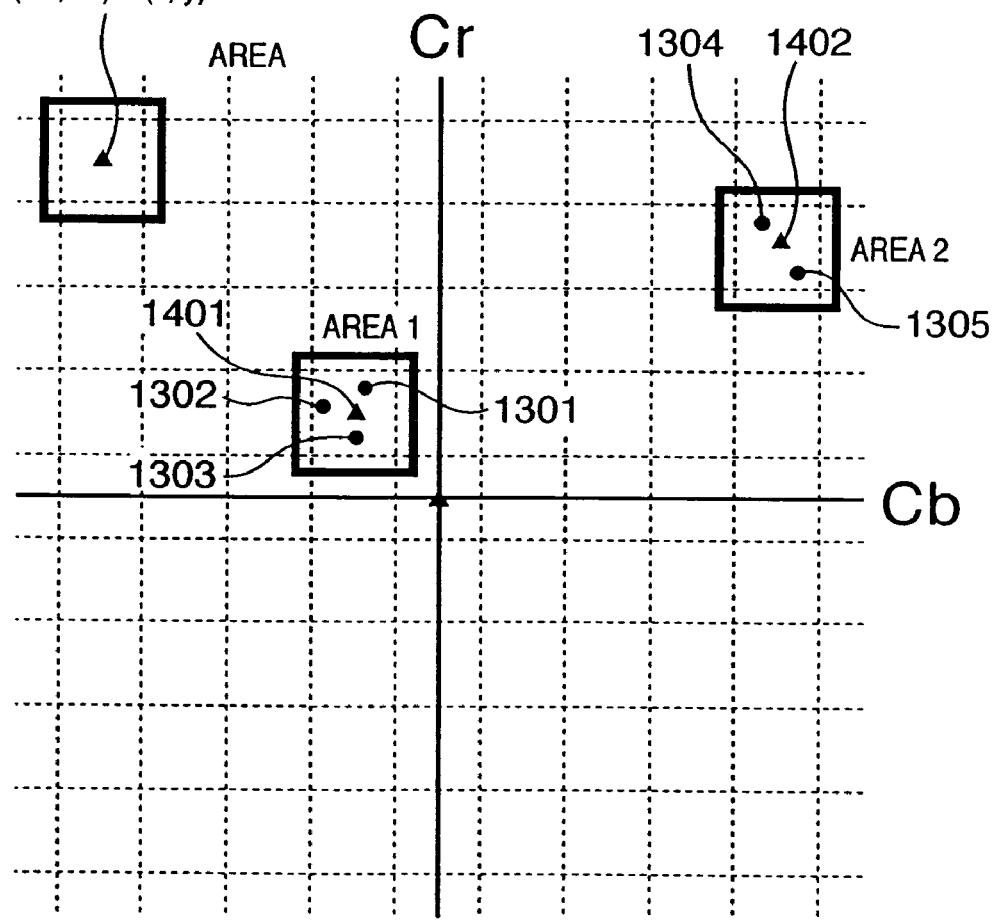
FIG. 14 is a view for explaining processing in the representative color extracting unit in the embodiment of the present invention.

Assume that each rectangle enclosed with dotted lines in FIG. 14 indicates a preset area, and one representative color (Cb, Cr) is set in each area. Although the size of each area can be arbitrarily set, the size is preferably set in consideration of the tradeoff between precision and processing efficiency.

If each YCbCr value consists of 8 bits, the vertical/horizontal width of each area is set to 3 bits in this embodiment. For the sake of simplicity, however, FIG. 14 shows enlarged views of areas. In this case, the respective areas are scanned in the Cb-Cr direction to acquire a maximum number of plots in the areas. In this case, since a maximum number of plots, 3, can be obtained in area 1, 1401 (black triangle ▲) is obtained as a representative color. Alternatively, a representative color may be calculated from these three plots.

Refer back to FIG. 12A.

It is checked in step S1502 whether or not a target character region is an inverted character region. If an inverted character region is determined (YES in step S1502), C'(n) extracted in step S1503 is adjusted. This adjustment is made to correct a representative color into a predetermined color (white), which is erroneously extracted because the background color of an inverted character region of the input image is blurred with a character portion which should be white because of variations due to scanner reading or a deterioration due to JPEG compression or the like.

The details of step S1503 will be described with reference to FIG. 12B.

FIG. 12B is a flow chart showing the details of step S1503 in the embodiment of the present invention.

First of all, in step S1511, WhiteFlag is initialized to OFF. In step S1512, a distance Distance_R from an origin (Cb, Cr)=(0, 0) on the color space of the representative color C'(n) is calculated. In step S1513, it is checked whether the distance Distance_R is equal to or less than a predetermined value value_R.

If the distance Distance_R is larger than the predetermined value value_R (NO in step S1513), the processing is terminated, and the flow advances to step S1504. If the distance Distance_R is equal to or less than the predetermined value value_R (YES in step S1513), WhiteFlag is set to ON, and the flow advances to step S1504.

Note that WhiteFlag is a flag indicating whether or not the representative color C'(n) is set to (Cb, Cr)=(0, 0) representing a predetermined color (white). If this flag is ON, the representative color C'(n) is set to (Cb, Cr)=(0, 0) in step S1509.

Refer back to FIG. 12A.

If it is determined in step S1502 that the target character region is not an inverted character region (NO in step S1502), the flow advances to step S1504, and 1 is set to a unit character count m. It is then checked in step S1505 whether m is equal to or less than M. If m is equal to or less than M (YES in step S1505), the flow advances to step S1506. If m is larger than M (NO in step S1505), the processing is terminated.

In this case, M is a unit character count (total count) in a target character region. For example, in the character region 801 in FIG. 9, M=5. In this case, if m=1, YES is obtained in step S1505, and the flow advances to step S1506. When m=6, NO is obtained in step S1505, and the flow exits from the loop of step S1206.

In step S1506, it is checked whether or not a unit character color C(m) as the average color of unit character regions has not been determined. If the unit character color C(m) has not been determined (NO in step S1506), the flow advances to step S1507. If the unit character color C(m) has been determined (YES in step S1506), the flow advances to step S1507.

In this case, the unit character color C(m) is a structure having Cb and Cr information. Let C(m)_b be Cb of the mth unit character color, and C(m)_r be CR of the mth representative color. Since no value is assigned to the unit character color C(m) at first, it is determined that C(m) has not been determined, and the flow advances to step S1507.

In step S1507, the distance (Distance) between the candidate representative color C'(n) and the unit character color C(m) on the color space is calculated.

In step S1508, it is checked for a predetermined value value whether Distance≦value. If Distance≦value is not satisfied (NO in step S1508), the flow advances to step S1510. If Distance≦value (YES in step S1508), i.e., the unit character color C(m) can be regarded as an approximate color to the candidate representative color C'(n), the flow advances to step S1509.

In step S1509, the candidate representative color C'(n) is set to the unit character color C(m) (the representative color of the unit character region). That is, C'(n)_b is assigned to C(m)_b, and C'(n)_r is assigned to C(m)_r. In step S1510, the unit character count m is incremented by one, and the flow returns to step S1505.

Note that value in step S1508 is a threshold for determining whether the unit character color C(m) is an approximate color to the candidate representative color C'(n). This value can be arbitrarily adjusted. As described above, if the target character region is an inverted character region and WhiteFlag is ON, 0 is assigned to C(m)_and C(m)_r.

When a representative color is calculated from a two-dimensional histogram, since it does not have the luminance component Y, the luminance component Y must be calculated between unit characters having the same representative color within the character region. If the RGB information of a representative color is required, color space conversion from YCbCr to RGB is performed.

In the above manner, representative color extraction and color assignment for each unit character region are performed by using the partial binary image 107 and reduced multilevel image 114, in particular, according to the flow charts of FIGS. 10, 11, 12A, and 12B. The extracted representative color is stored as each character representative color 111 in FIG. 1 in the compressed data 118.

The processing executed by the character region padding unit 115 will be described next with reference to FIG. 15.

Figure 15:
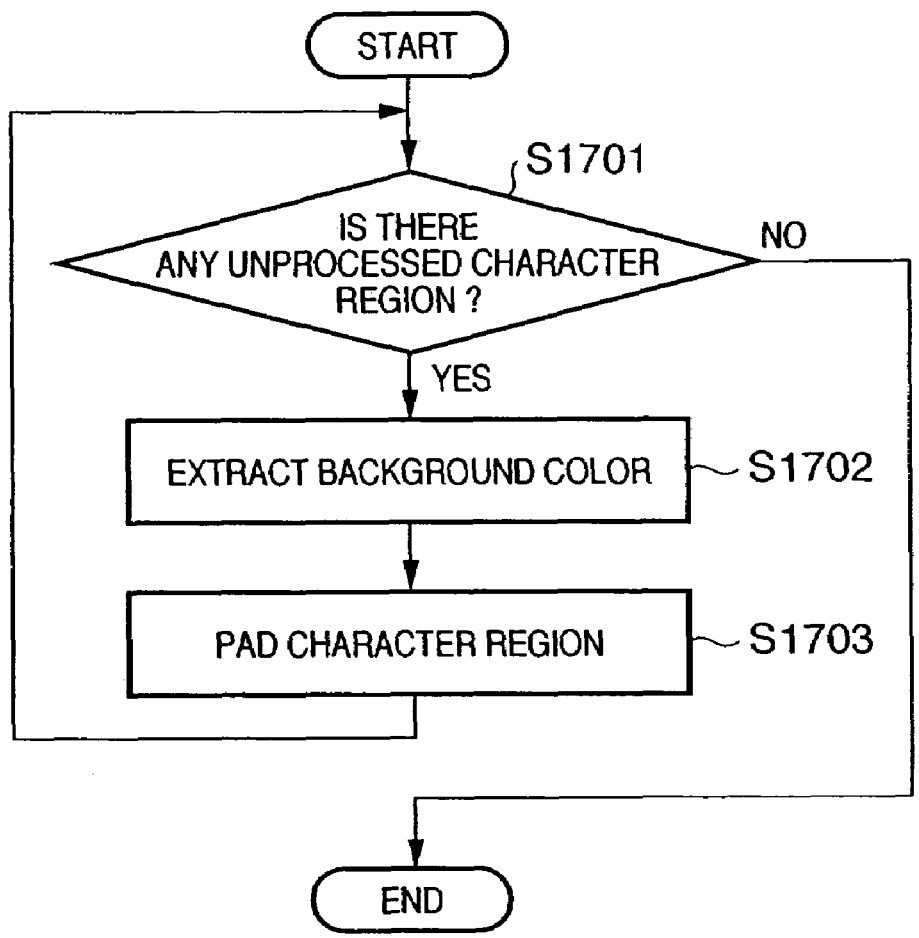
FIG. 15 is a flow chart showing the processing executed by a character region padding unit in the embodiment of the present invention.

FIG. 15 is a flow chart showing the processing executed by the character region padding unit in the embodiment of the present invention.

The character region padding unit 115 receives and refers to the reduced multilevel image 114, partial binary image 107, and character region coordinates 106, and pads pixels corresponding to the characters in the reduced multilevel image 114 with the color of the neighboring background. This improves the compression ratio of the JPEG compression unit 116 on the subsequent stage.

First of all, in order to perform processing for each character region, it is checked in step S1701 whether there is any unprocessed character region. If there is no unprocessed character region (NO in step S1701), the processing is terminated. If there is an unprocessed character region (YES in step S1701), the flow advances to step S1702 to calculate the average value of background colors in the character region by referring to the color of the reduced multilevel image 114 positionally corresponding to the white pixels of the partial binary image 107. A method of making the coordinates of the partial binary image 107 correspond to those of the reduced multilevel image 114 is the same as that described with reference to the representative color extracting unit 110, and hence a detailed description thereof will be omitted.

In step S1703, the calculated average value of the background colors is assigned to the character region of the reduced multilevel image 114. That is, the character region of the reduced multilevel image 114 or a unit character region in the character region is padded with the calculated background color.

The image decompression apparatus for decompressing the compressed data 118 will be described next with reference to FIG. 16.

FIG. 16 is a view showing the schematic arrangement of the image decompression apparatus according to the embodiment of the present invention.

An MMR decompressing unit 1803 receives the compressed code A 109 and performs MMR decompression processing to create a binary image 1804. A JPEG decompressing unit 1809 receives the compressed code B 117 and performs JPEG decompression processing. An enlarging unit 1810 also performs enlargement processing to create a multilevel image 1811. A combining unit 1805 assigns each character representative color 111 to a corresponding one of the black pixels in a corresponding unit character region in the binary image 1804 while referring to the character region coordinates 106, and displays the resultant binary image on the multilevel image 1811. In this case, the white pixels of the binary image 1804 are transmitted through the multilevel image 1811.

The image decompression apparatus in FIG. 16 can create a decompressed image 1806 as a final reconstructed image by decompressing the compressed data 118 created by the image compression apparatus in FIG. 1 in this manner.

As has been described above, according to this embodiment, it is checked whether or not a character region is an inverted character region, and representative color extraction and assignment are performed for a binary image in a character region and unit character regions constituting the character region, thereby extracting an appropriate representative color and assigning it to each character region.

In addition, the representative color of each unit character region is created as part of compressed data. When a reconstructed image is to be obtained by decompressing this compressed data, the color of each unit character region in each character region is reproduced by using this representative color. This makes it possible to reproduce a reconstructed image with the quality of the input image, and more specifically, the quality of an inverted character region, being properly maintained.

In addition, by compressing a character region using MMR compression instead of JPEG compression which has conventionally been used, a more highly compressed image can be created.

The image compression apparatus and image decompression apparatus in the above embodiment can be implemented by an information processing apparatus such as a personal computer having an image compression function and image decompression function. The present invention can therefore be regarded as an invention of a method as an algorithm for implementing the functions. In addition, since the present invention can be implemented by a computer, the present invention can be obviously applied to computer programs executed by the respective apparatuses and a computer-readable storage medium such as a CD-ROM in which the computer programs can be stored and from which they can be loaded into the computer.

Claims according to the above embodiment are therefore listed as follows. That is, the following are an image compression apparatus and image decompression apparatus, their methods, and programs.

Although an embodiment has been described in detail above, the present invention can be applied to a system constituted by a plurality of devices, or to an apparatus comprising a single device.

The present invention incorporates a case wherein programs of software for implementing the functions of the embodiment described above (programs corresponding to the flow charts shown in the accompanying drawings in the embodiment) are directly or remotely supplied to a system or apparatus to cause the computer of the system or apparatus to read out and execute the programs, thereby implementing the functions.

The program codes themselves which are supplied and installed in the computer to allow the computer to implement the functions/processing of the present invention also realize the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a home page on the Internet by using a browser to download each computer program of the present invention itself from the home page or download a compressed file containing an automatic install function into a recording medium such as a hard disk. Alternatively, the programs can be supplied by dividing the program codes constituting each program of the present invention into a plurality of files, and downloading the respective files from different home pages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a home page through the Internet, executing the encrypted programs using the key information, and allowing a computer to install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

The present invention is not limited to the above embodiments and various changes and modifications can be made within the spirit and scope of the present invention. Therefore, to apprise the public of the scope of the present invention, the following claims are made.

What is claimed is:

1. An image processing apparatus which compresses an input multilevel image, comprising:
   binarizing means for binarizing the multilevel image;
   first region specifying means for specifying a position of a character region in the binary image binarized by said binarizing means, and determining whether or not the specified character region is an inverted character region;
   second region specifying means for specifying a position of a unit character region in the character region specified by said first region specifying means;
   reducing means for reducing the multilevel image;
   representative color extracting means for extracting a representative color of the unit character region on the basis of region type information indicting whether or not the character region specified by said first region specifying means is an inverted character region, position information of the unit character region specified by said second region specifying means, and the reduced multilevel image;
   padding means for padding a unit character region in the character region of the reduced multilevel image with a neighboring color on the basis of the position information of the character region specified by said first region specifying means;
   first compression means for compressing the padded reduced multilevel image created by said padding means;
   second compression means for compressing a partial binary image corresponding to the character region specified by said first region specifying means; and
   output means for outputting compressed data containing the position information specified by said first and second region specifying means, first and second compressed codes created by said first and second compression means, and representative color information of the unit character region extracted by said representative color extracting means.

2. The apparatus according to claim 1, wherein said representative color extracting means comprises:
   average color calculating means for calculating an average color of the unit character region by using the position information of the unit character region specified by said second region specifying means and referring to color information of the reduced multilevel image,
   first histogram creating means for creating a first histogram from the average color of the unit character regions created by said average color calculating means,
   extracting means for extracting a candidate representative color serving as a representative color candidate of the unit character region on the basis of the first histogram, and
   color assigning means for assigning the candidate representative color to a representative color of the unit character on the basis of region type information indicating whether or not the character region specified by said first region specifying means is an inverted character region, the candidate representative color extracted by said extracting means, and the average color of the unit character regions.

3. The apparatus according to claim 2, wherein said binarizing means comprises:
   second histogram creating means for creating a second histogram on the basis of the multilevel image, and
   binarization threshold calculating means for calculating a binarization threshold for binarizing the multilevel image on the basis of the second histogram.

4. The apparatus according to claim 1, wherein said first region specifying means specifies regions, which are specified by contour line tracking of pixels having a predetermined value in the binary image, as a character region or a natural image region, specifies whether the character region is an inverted character region, and specifies attribute information indicating position information, size information, and a type of each of the regions.

5. The apparatus according to claim 1, wherein said second region specifying means specifies, as a unit character region, a set of pixels having a predetermined value in the character region specified by said first region specifying means, and specifies position information and size information of the unit character region.

6. The apparatus according to claim 2, wherein said average color calculating means calculates an average color of the unit character regions by using position information of a unit character region specified by said second region specifying means and referring to color information of the reduced multilevel image corresponding to pixels having a predetermined value in the unit character region.

7. The apparatus according to claim 2, wherein said first histogram creating means creates a color space histogram in a character region constituted by the unit character regions as a first histogram by using an average color of the unit character regions which is calculated by said average calculating means.

8. The apparatus according to claim 7, wherein said extracting means extracts candidate representative colors as candidates of representative colors of the unit character regions in descending order of output frequency of color distributions in the color spatial histogram.

9. The apparatus according to claim 8, wherein said color assigning means calculates a distance between a candidate representative color extracted by said extracting means and an average color of the unit character regions on a color space, and assigns the candidate representative color as a representative color of the unit character regions if the distance falls within a predetermined range.

10. The apparatus according to claim 8, wherein said color assigning means calculates a distance between a candidate representative color extracted by said extracting means and an average color of the unit character regions on a color space, and assigns a predetermined color as a representative color of the unit character regions if the distance falls within a predetermined range and the character region constituted by the unit character regions is an inverted character region.

11. The apparatus according to claim 1, wherein said reducing means converts a resolution of the multilevel image by using a resolution conversion parameter.

12. The apparatus according to claim 1, wherein said padding means pads a unit character region in a character region of the reduced multilevel image corresponding to a position corresponding to a reduction ratio set by said reducing means on the basis of position information of the character region specified by said first region specifying means.

13. The apparatus according to claim 1, wherein said first compression means complies with JPEG compression.

14. The apparatus according to claim 1, wherein said second compression means complies with MMR compression.

15. The apparatus according to claim 1, further comprising third compression means for losslessly compressing the compressed data.

16. An image processing apparatus which decompresses compressed data, comprising:
    input means for inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;
    first decompressing means for decompressing the first compressed code in the compressed data;
    second decompressing means for decompressing the second compressed code in the compressed data;
    enlarging means for enlarging a reduced multilevel image decompressed by said second decompressing means; and
    combining means for combining a binary image decompressed by said decompressing means and a multilevel image enlarged by said enlarging means.

17. An image processing method of compressing an input multilevel image, comprising:
    a binarizing step of binarizing the multilevel image;
    a first region specifying step of specifying a position of a character region in the binary image binarized in the binarizing step, and determining whether or not the specified character region is an inverted character region;
    a second region specifying step of specifying a position of a unit character region in the character region specified in the first region specifying step;
    a reducing step of reducing the multilevel image;
    a representative color extracting step of extracting a representative color of the unit character region on the basis of region type information indicting whether or not the character region specified in the first region specifying step is an inverted character region, position information of the unit character region in the second region specifying step, and the reduced multilevel image;
    a padding step of padding a unit character region in the character region of the reduced multilevel image with a neighboring color on the basis of the position information of the character region specified in the first region specifying step;
    a first compression step of compressing the padded reduced multilevel image created in the padding step;
    a second compression step of compressing a partial binary image corresponding to the character region specified in the first region specifying step; and
    an output step of outputting compressed data containing the position information specified in the first and second region specifying steps, first and second compressed codes created in the first and second compression steps, and representative color information of the unit character region extracted in the representative color extracting step.

18. An image processing method of decompressing compressed data, comprising:
    an input step of inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;
    a first decompressing step of decompressing the first compressed code in the compressed data;
    a second decompressing step of decompressing the second compressed code in the compressed data;
    an enlarging step of enlarging a reduced multilevel image decompressed in the second decompressing step; and
    a combining step of combining a binary image decompressed in the decompressing step and a multilevel image enlarged in the enlarging step.

19. A computer readable storage medium on which is stored a computer executable program embodied on a computer readeable medium which when excuted by a computer realizes image compression of compressing an input multilevel image, the program comprising:
    a program code for a binarizing step of binarizing the multilevel image;
    a program code for a first region specifying step of specifying a position of a character region in the binary image binarized in the binarizing step, and determining whether or not the specified character region is an inverted character region;
    a program code for a second region specifying step of specifying a position of a unit character region in the character region specified in the first region specifying step;
    a program code for a reducing step of reducing the multilevel image;
    a program code for a representative color extracting step of extracting a representative color of the unit character region on the basis of region type information indicting whether or not the character region specified in the first region specifying step is an inverted character region, position information of the unit character region specified in the second region specifying step, and the reduced multilevel image;
    a program code for a padding step of padding a unit character region in the character region of the reduced multilevel image with a neighboring color on the basis of the position information of the character region specified in the first region specifying step;

a program code for a first compression step of compressing the padded reduced multilevel image created in the padding step;

a program code for a second compression step of compressing a partial binary image corresponding to the character region specified in the first region specifying step; and a program code for an output step of outputting compressed data containing the position information specified in the first and second region specifying steps, first and second compressed codes created in the first and second compression steps, and representative color information of the unit character region extracted in the representative color extracting step.

20. A computer readable storage medium on which is stored a computer executable program embodied on a computer readeable medium which when excuted by a computer realizes image decompression of decompressing compressed data, the program comprising:

a program code for an input step of inputting compressed data containing a first compressed code obtained by compressing a character region or inverted character region in a binary image obtained by binarizing a multilevel image, a second compressed code obtained by compressing a reduced multilevel image obtained by padding a unit character region in a character region or inverted character region in the reduced multilevel image of the multilevel image with a neighboring color, position information of the character region or inverted character region, and representative color information of a unit character region in the character region or inverted character region;

a program code for a first decompressing step of decompressing the first compressed code in the compressed data;

a program code for a second decompressing step of decompressing the second compressed code in the compressed data;

a program code for an enlarging step of enlarging a reduced multilevel image decompressed in the second decompressing step; and a program code for a combining step of combining a binary image decompressed in the decompressing step and a multilevel image enlarged in the enlarging step.

21. An image processing apparatus which compresses an input multilevel image, comprising:

binarizing means for binarizing the multilevel image;

first region specifying means for specifying a position of a character region in the binary image binarized by said binarizing means, and determining whether or not the specified character region is an inverted character region;

second region specifying means for specifying a position of a unit character region in the character region specified by said first region specifying means; and representative color extracting means for extracting a representative color of the unit character region on the basis of region type information indicting whether or not the character region specified by said first region specifying means is an inverted character region, position information of the unit character region specified by said second region specifying means, and the multilevel image.

22. The apparatus according to claim 21, wherein said extracting means extracts a representative color of the inverted character region, after the inverted character region is applied by an inversion processing.

23. An image processing method of compressing an input multilevel image, comprising:

a binarizing step of binarizing the multilevel image;

a first region specifying step of specifying a position of a character region in the binary image binarized in the binarizing step, and determining whether or not the specified character region is an inverted character region;

a second region specifying step of specifying a position of a unit character region in the character region specified in the first region specifying step; and a representative color extracting step of extracting a representative color of the unit character region on the basis of region type information indicting whether or not the character region specified in the first region specifying step is an inverted character region, position information of the unit character region specified in the second region specifying step, and the multilevel image.

24. The method according to claim 23, wherein said representative color extracting step extracts a representative color of the inverted character region, after the inverted character region is applied by an inversion processing.

* * * * *

UNITED STATES PATENT AND TRADEMARK OFFICE
CERTIFICATE OF CORRECTION

| | |
|---|---|
| PATENT NO. | : 7,386,168 B2 |
| APPLICATION NO. | : 10/781671 |
| DATED | : June 10, 2008 |
| INVENTOR(S) | : Reiji Misawa |

It is certified that error appears in the above-identified patent and that said Letters Patent is hereby corrected as shown below:

COLUMN 4:
      Line 38, "indicting" should read -- indicating --.

COLUMN 5:
      Line 33, "indicting" should read -- indicating --.

COLUMN 6:
      Line 28, "indicting" should read -- indicating --; and
      Line 50, "indicting" should read -- indicating --.

COLUMN 8:
      Line 36, "than" should read -- rather than --.

COLUMN 12:
      Line 33, "plot 1363" should read -- plot 1303 --.

COLUMN 17:
      Line 37, "indicting" should read -- indicating --.

COLUMN 19:
      Line 59, "indicting" should read -- indicating --.

COLUMN 20:
      Line 42, "readeable" should read -- _readable --;
      Line 42, "excuted" should read -- executed --; and
      Line 60, "indicting" should read -- indicating --.

COLUMN 21:
      Line 20, "excuted" should read -- executed --.

UNITED STATES PATENT AND TRADEMARK OFFICE
CERTIFICATE OF CORRECTION

PATENT NO.        : 7,386,168 B2
APPLICATION NO.   : 10/781671
DATED             : June 10, 2008
INVENTOR(S)       : Reiji Misawa It is certified that error appears in the above-identified patent and that said Letters Patent is hereby corrected as shown below:

<u>COLUMN 22</u>:
        Line 14, "indicting" should read -- indicating --; and
        Line 36, "indicting" should read -- indicating --.

Signed and Sealed this

Tenth Day of March, 2009

JOHN DOLL
*Acting Director of the United States Patent and Trademark Office*